United States Patent

Böhm et al.

Patent Number: 5,230,940
Date of Patent: Jul. 27, 1993

[54] FORMABLE SHEET-FORM TEXTILE MATERIAL FOR LINING NOISE-AFFECTED ROOMS AND PROCESS FOR ITS PREPARATION

[75] Inventors: Robert R. Böhm, Wiesenbach; Erwin Schneider, Fulda; Dietrich Hahl, Kuerten; Peter J. Russell, Leverkusen; Hans-Günter Vogt, Dormagen, all of Fed. Rep. of Germany

[73] Assignee: Bayer Aktiengesellschaft, Fed. Rep. of Germany

[21] Appl. No.: 727,667

[22] Filed: Jul. 9, 1991

Related U.S. Application Data

[63] Continuation of Ser. No. 233,160, Aug. 17, 1988, abandoned.

[30] Foreign Application Priority Data

Aug. 21, 1987 [DE] Fed. Rep. of Germany ....... 3727932
Jan. 14, 1988 [DE] Fed. Rep. of Germany ....... 3800779

[51] Int. Cl.$^5$ .................... B32B 33/00; B32B 5/2; B32B 5/14; D04H 1/16
[52] U.S. Cl. ........................ 428/95; 428/97; 428/282; 428/300; 428/301; 428/308.4; 428/318.6
[58] Field of Search .............. 428/86, 87, 95, 96, 428/237, 282, 281, 280, 308.4, 317.9, 318.6, 300, 301, 97

[56] References Cited

U.S. PATENT DOCUMENTS

| | | | |
|---|---|---|---|
| 1,832,571 | 11/1931 | Nash | 428/237 |
| 2,980,575 | 4/1961 | Petry | 428/282 |
| 4,445,959 | 5/1984 | Hombach et al. | 156/332 |
| 4,463,049 | 7/1984 | Kracke | 428/282 |

Primary Examiner—George F. Lesmes
Assistant Examiner—Terrel Morris
Attorney, Agent, or Firm—Connolly & Hutz

[57] ABSTRACT

A formable sheet-form textile material for lining noise-affected rooms, particularly the passenger compartment of motor vehicles, consisting of a fabric, a needled or tufted layer as the visible surface, at least one thermoformable and foam-backable layer and a foamed back-coating, in which the layer serving as the visible surface consists of needlefelt or of a tufted surface (2) needled into felt as the backing layer (1), to the back of which a layer (3) of foamed latex, an impermeable barrier layer (4) and, optionally, the foamed backcoating (5) are applied. The backing layer may also be a thin layer of a lightly bonded felt onto which a thicker layer of an unbonded felt is laminated by means of a binder which simultaneously binds the needling into the backing layer. The layers have a permeability to sound which continuously decreases from the backing layer (1) to the backcoating (5). The barrier layer (4) is formed by a film or by a coating of unfoamed latex.

12 Claims, 1 Drawing Sheet

FORMABLE SHEET-FORM TEXTILE MATERIAL FOR LINING NOISE-AFFECTED ROOMS AND PROCESS FOR ITS PREPARATION

CROSS-REFERENCE TO RELATED APPLICATION

The present application is a continuation of application Ser. No. 233,160, filed Aug. 17, 1989, now abandoned.

This invention relates to a formable sheet-form textile material.

Known sheet-form textiles for this purpose consist of a spunbonded base fabric in which tufts are inserted. The reverse of the construction is coated with a layer of sintered polyethylene to which is laminated a lightweight nonwoven fabric. This fabric is coated with a polyurethane foam. In this case, the polyethylene layer applied by sintering is used both to bind the tufts into the backing layer and as a source of dimensional stability after forming and as a barrier layer against the penetration of foam from the backcoating to the visible surface while another layer filled with chalk or heavy spar is used to improve noise and sound insulation in the room. Known formable linings have been functionally successful insofar as they are easy to manufacture and are very easy to fit, particularly by forming into the shape corresponding to the surface to be lined. Their disadvantage is their generally inadequate insulating effect against sound which necessitates the fitting of separate insulation packings to obtain an adequate reduction in the noise level in the room. This not only increases production and fitting costs, but also—in automotive construction—adds considerably to the unloaden weight of the vehicle.

The object of the present invention is to provide a formable surface lining with improved sound-insulating properties which—partly—eliminates the need to fit sound insulation packings to obtain satisfactory sound insulation.

The invention provides a formable sheet-form material which, despite adequate dimensional stability after forming, is far less stiff than known preformed surface linings, the use of felt instead of nonwoven material as the base for the tufts additionally providing for a continuous reduction in permeability to sound from the layer of felt via the foamed and hence porous layer to the adjoining thin barrier layer or the filled foam backing. The porous latex layer may also be filled. The basis for the necessary dimensional stability is the layer of felt in conjunction with the latex foam backing which, on the one hand, is formable and retains its shape after forming and, on the other hand, penetrates into the boundary region of the felt layer where it forms a (thin) "fiber-reinforced latex layer" or a latex-bonded fabric which gives the sheet-form material as a whole adequate tensile strength. The considerable reduction in stiffness by comparison with known formed surface linings in conjunction with the continuous reduction in sound permeability from the backing layer to the backcoating forms the basis for the outstanding sound-insulation properties of the preformed surface lining, by means of which the sound-insulating and sound-absorbing properties of the lining can be considerably—for the crucial frequencies distinctly—reduced. Depending on the requirements which noise insulation has to satisfy in the lined room, there may even be no need to use additional sound insulation packings where the lining according to the invention is used.

A particularly suitable latex base for the foam layer consists of copolymers or mixtures of copolymers of A. 36 to 90 and preferably 45 to 80 parts by weight of
   a) an aromatic $C_8$–$C_{14}$ vinyl and/or vinylidene compound and/or
   b) methyl methacrylate, up to 50 and preferably up to 30% by weight of the sum (a+b) being replaceable by
   c) acrylonitrile,
B. 10 to 64 and preferably 20 to 55 parts by weight of a conjugated $C_4$–$C_9$ diene and/or $C_2$–$C_8$ alkyl acrylate,
C. 0 to 8 and preferably 0.5 to 5 parts by weight of an $\alpha,\beta$-ethylenically unsaturated $C_3$–$C_5$ mono- and/or $C_4$–$C_6$ dicarboxylic acid and
D. 0 to 10 parts by weight of other copolymerizable compounds, the sum of components A. to D. being 100 parts by weight.

The aromatic vinyl or vinylidene compounds a) advantageously include styrene, $C_1$–$C_4$-alkyl-substituted styrenes, such as 4-methyl styrene and $\alpha$-methyl styrene, also divinyl benzene and vinyl naphthalene, more particularly unsubstituted styrene.

The conjugated dienes B. advantageously include 1,3-butadiene, 2-methyl-1,3-butadiene (isoprene), 2,3-dimethyl-1,3-butadiene, conjugated pentadienes or hexadienes, more particularly 1,3-butadiene.

The acrylates B. advantageously include ethyl, 2-ethyl hexyl and, in particular, n-butyl acrylate.

The unsaturated mono- and dicarboxylic acids C advantageously include acrylic and methacrylic acid, maleic, fumaric, citraconic and itaconic acid, more especially acrylic and methacrylic acid.

The copolymerisable compounds D advantageously include acrylamide and methacrylamide, $C_2$–$C_8$ alkyl methacrylates, for example ethyl, butyl and hexyl methacrylate, methyl acrylate and the $C_1$–$C_{12}$ alkyl semiesters of the dicarboxylic acids C., for example maleic acid-n-dodecyl semiester or fumaric acid-n-butyl semiester, vinyl chloride, vinylalkyl ethers containing 1 to 4 carbon atoms in the alkyl group, monoesters of $C_2$–$C_4$ glycols and (meth)acrylic acid, vinyl esters of $C_1$–$C_{18}$ carboxylic acids, such as vinyl acetate or vinyl stearate.

1,3-Butadiene, styrene, acrylonitrile, n-butyl acrylate, methacrylic acid, acrylic acid, maleic, fumaric and itaconic acid are used with particular advantage as monomers. The copolymers preferably used as the latex base consist of 45 to 80 parts by weight styrene units and optionally acrylinitrile units, 20 to 55 parts by weight butadiene units or n-butyl acrylate units and 0 to 5 parts by weight unsaturated acid C units.

In one preferred embodiment of the invention, the latex used contains at least two polymers having different glass transition temperatures, of which at least one polymer determines hardness and another polymer film formation, for which purpose a mixture of at least one latex of a polymer having a high glass transition temperature (hereinafter referred to as the "hard latex") and a latex of at least one polymer having good film-forming properties (hereinafter referred to as the "soft latex") is advantageously used. Preferred polymers for the hard latex comprise 92 to 100 and preferably 95 to 99.5% by weight polymerized units of component A. and 0 to 8 and preferably 0.5 to 5% by weight copolymerized units of component C., based in either case on hard latex polymer.

Preferred polymers for the soft latex comprise 20 to 75% by weight and preferably 30 to 54.5% by weight copolymerized units of component A., 25 to 80 and preferably 45 to 69.5% by weight copolymerized units of component B., 0 to 8 and preferably 0.5 to 5% by weight copolymerized units of component C. and 0 to 10% by weight copolymerized units of component D., based in each case on soft latex polymer.

According to a preferred embodiment of the invention, a polychloroprene latex is used as the soft latex. In this context the term "polychloroprene" means a polymer prepared by polymerization of 2-chlorobutadiene which polymer may contain up to 10% by weight, based on polychloroprene, of copolymerized units of ethylenically unsaturated comonomers having from 3 to 12 carbon atoms and 1 to 2 copolymerizable carbon/carbon double bonds per molecule. Examples for suitable comonomers are 2,3-dichlorobutadiene, 1-chlorobutadiene, styrene, butadiene, isoprene, acrylonitrile, methacrylonitrile and the above disclosed monomers of group C. The polychloroprene to be used can be sulphur-modified; in this case, from 0.05 to 1.5, preferably from 0.1 to 1%, by weight, based on polymerizable monomer, of elementary sulphur or the equivalent quantity of sulphur donor are used together with the chloroprene for the polymerization.

The ratio of soft latex to hard latex may range from 30:70 to 70:30% by weight.

Polymers having glass temperatures Tg above 90° C. and more especially above 100° C. are preferably used for the preparation of the hard latices while polymers having glass transition temperatures below 30° C. are preferably used for the preparation of the soft latices.

The average particle diameters $d_{50}$ of the latex polymers are preferably between 50 and 300 nm, particularly between 80 and 250 μm, the average particle diameter $d_{50}$ of the soft latex polymers advantageously being from 80 to 200 nm and those of the hard latex polymers advantageously from 150 to 250 nm. The "average particle diameter $d_{50}$" is understood to be the diameter above which 50% by weight and below which 50% by weight of the particles lie. It may be determined by ultracentrifuge measurements (W. Scholtan, H. Lange, Kolloid Z. and Z. Polymere 250 (1972), 782–796) or by electron microscopy and subsequent particle counting (G. Kämpf, H. Schuster, Angew, Makromolekulare Chemie 14 (1970), 111–129).

The soft latices can contain the polymer also in agglomerated form. This may be advantageous when a high solids content is desired which cannot otherwise be obtained. Thus, solids contents of, for example, from 55 to 70% by weight, based on soft latex, can be obtained without difficulty.

The polymers of the soft latices guarantee satisfactory film formation, particularly when 1 mm thick films have an elongation at break of at least 200% and, better still, of at least 350%. The polymers particularly suitable for these latices may be uncrosslinked. However, crosslinked polymers generally having a gel content of at least 40% by weight (as measured in toluene) are advantageously used for the soft latices.

The polymers are prepared by known methods. To avoid premature gelation, the polymerization is best carried out in the presence of chain transfer agents (regulators), for example alkylmercaptans having a chain length of 4 to 20 carbon atoms, such as for example tert.-dodecylmercaptan, also alkylmercaptans containing further functional groups, such as 2-mercaptoethanol or thioglycolic acid, and/or organic halogen compounds, such as carbon tetrabromide or bromomethylbenzene. The quantity used depends inter alia on the effectiveness of the regulator and is generally in the range from 0.5 to 2.0 parts by weight per 100 parts by weight monomer.

The aqueous rubber latices can be prepared in a known manner by emulsion polymerization using emulsifiers. Anionic, cationic or nonionic dispersants or combinations thereof are used for this purpose in a quantity of 0.1 to 7% by weight (based on monomer). They have a solids content of generally 40 to 70% by weight and preferably 45 to 60% by weight. Suitable initiators are inorganic peroxo compounds, such as hydrogen peroxide, sodium, potassium or ammonium peroxodisulfate, peroxycarbonates and borate peroxyhydrates, also organic peroxo compounds, such as acyl hydroperoxides, diacyl peroxides, alkyl hydroperoxides, dialkyl peroxides and esters, such as tert.-butyl perbenzoate. The initiator is generally used in a quantity of 0.01 to 2% by weight, based on the total quantity of monomers used.

Foaming may be carried out mechanically using standard units, the viscosity of the latex advantageously being increased to 8000 to 12,000 mPa.s (Brookfield RV viscosimeter, spindle 5, 20 r.p.m., 23° C.) by addition of thickeners and foam stabilizers optionally being added before foaming. Where unfilled latex is used, it is best to use foams having a weight per liter of 380 to 420 g/l.

Fillers, such as for example chalk or barium sulfate, may of course also be added to the latices, preferably in quantities of 20 to 100% by weight, based on latex solids, in order to obtain certain properties, for example improved sound insulation.

The foam height (wet) on the carpet generally measures 1 to 10 mm and preferably 2 to 5 mm, drying best being carried out at a temperature of 130° to 180° C. and preferably at a temperature of 140° to 160° C.

A gas-impermeable layer, for example in the form of a film, may then be applied to the foam backing thus produced. It is also possible to apply another (unfoamed) latex layer, the latex used for this purpose corresponding substantially to the composition of the foam latex. Latices of 15 to 30 parts hard latex and 85 to 70 parts soft latex are particularly suitable for this purpose, the desired viscosity being established by addition of a thickener. Since the gas-impermeable layer must not contain any bubbles, it is of advantage to use foam inhibitors. A viscosity of 5000 to 12,000 mPa.s (Brookfield RV viscosimeter, spindle 5, 20 r.p.m., 23° C.) has proved to be suitable for most cases. The layer is best applied in a layer thickness (dry) of 80 to 120 and preferably of the order of 100 μm. Drying may be carried out in the same way as for the latex foam.

The carpet made in this way is then suitably compressed, for example by means of cooled rollers, under a pressure of 2 to 20 bar and preferably 5 to 10 bar and heated, for example, in an IR field to its forming temperature of around 170° to 180° C., followed by forming, for example by deep drawing.

Further embodiments and advantages will become apparent from the following description in which the invention is explained by way of example with reference to the accompanying drawings, wherein.

Figure 1:
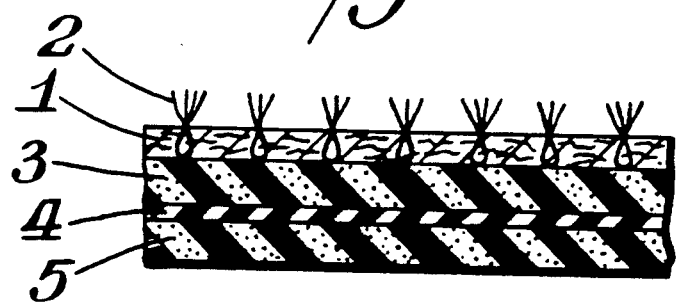
FIG. 1 is a diagrammatic section through a preformable lining according to the invention.

The preformed sheet-form textile material for lining noise-effected rooms, particularly the passenger compartment of motor vehicles, which is diagrammatically illustrated in the drawing consists of a backing layer 1 of felt, into which the tufts 2 are needled and to the back of which a layer 3 of foamed latex, an impermeable barrier layer 4 and also a sound-insulating foamed backcoating 5 are applied. The barrier layer 4 may be formed by a film or by a coating of unfoamed latex. In addition, the choice of the materials used is such that the layers, without forming reflection surfaces, have a permeability to sound which decreases continuously from the backing layer 1 to the backcoating 5. Instead of the visible surface 1, 2 tufted onto felt, a needlefelt may be used equally well as the visible surface.

Figure 2:
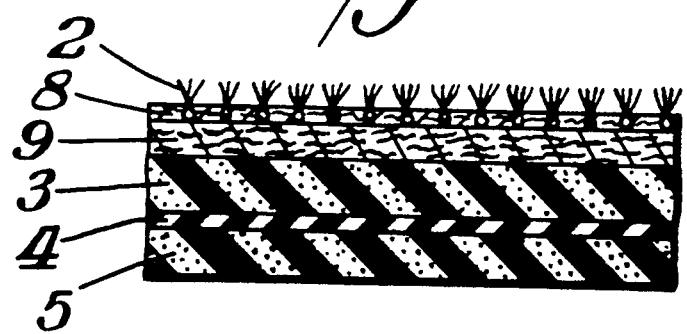
FIG. 2 shows another embodiment of a preformable lining.

In the embodiment of a preformed lining shown in FIG. 2, the backing layer for the tufted surface 2 consists of a thin layer of a lightly bonded felt 8, onto which a thicker layer of an unbonded felt 9 is laminated by means of a binder which is simultaneously used to bind the needling into the lightly bonded felt 8 and which also consists, for example, of a latex. In addition, the layer of unbonded felt 9 may be provided on that side facing the layer of lightly bonded felt 8 with an adhesive coating, for example with a layer or with spots of a hotmelt adhesive, so that the bond between the layers is further improved under the effect of the heat applied during forming. The unbonded felt may be applied in a single operation with the latex which binds the needling into the lightly bonded felt. For the rest, the reference numerals used in FIG. 1 are used to denote the same parts as in FIG. 2.

In the following Examples all parts and percentages are parts by weight and percentages by weight.

EXAMPLES

Example 1

I. Preparation of the starting latices

A. Soft latex

46 Parts water, 0.2 parts sodium lauryl sulfate and 0.1 part ammonium persulfate are heated under nitrogen to 80° C. and the following streams uniformly introduced over a period of 8 hours:
a) monomer stream consisting of 60 parts styrene, 38 parts butadiene, 2 parts acrylic acid and 1 part tert.-dodecylmercaptan;
b) aqueous stream consisting of 44 parts water, 2.0 parts sodium lauryl sulfate, 0.3 part ammonium persulfate and 0.5 part sodium hydroxide.

After the additions, the polymerization mixture is stirred for 4 hours at 80° C., after which the polymerization reaction is terminated by the addition of 0.8 part of a 25% aqueous diethyl hydroxylamine solution. The conversion comprises 99%. The residual monomers are removed in vacuo at 60° C. (5 hours).

The pH value is adjusted to 8 with 5% aqueous sodium hydroxide. The solids content measures 50%, the viscosity 200 mPa.s and the particle diameter $d_{50}$ 125 nm.

B. Hard latex

50 Parts water and 0.05 part sodium $C_{12}$–$C_{15}$ alkylsulfonate are heated under nitrogen to 80° C. 10 Parts styrene and a solution of 0.1 part ammonium persulfate in 3 parts water are then added, followed by polymerization for 30 minutes at 80° C. 90 Parts styrene and a mixture of 48 parts water, 2 parts sodium $C_{12}$–$C_{15}$ alkylsulfonate, 2.2 parts ethoxylated nonylphenol (on average 20 ethylene oxide units per molecule) and 0.025 part ammonium persulfate are then run in simultaneously over a period of 3 hours.

The pH value is adjusted to pH 8 with 5% sodium hydroxide while stirring for 3 hours at 80° C. The viscosity measures 150 mPa.s, the solids content 50% and the particle diameter $d_{50}$ 155 nm.

II. Production of the latex foam 70 parts hard latex dispersion,
130 parts soft latex dispersion,
9 parts sodium sulfosuccinamate (30% in water),
2 parts disodium N-octadecyl sulfosuccinate (25% in water) and
11 parts acrylate thickener (®Acrylron A 300 conc., a product of Protex/France, 12% in water)

are mixed (pH value 8.6; viscosity of the mixture 10,000 mPa.s) and adjusted by stir-foaming using a foam mixer to a foam weight per liter of 400 g/l.

III. Carpet backing

A) Unfilled

Similarly to a gel or nongel carpet foam, the latex foam is applied to the back of the carpet in a quantity of 500 to 600 g solids/m² tufted carpet by means of a doctor roller coater and treated with hot air at 150° C. until it is completely dry. A so-called finishing coat of an unfoamed mixture of 20% hard latex and 80% soft latex is then thickened with acrylate thickener to a viscosity of 10,000 mPa.s, applied in a layer thickness of 80 μm and again dried at 150° C.

On leaving the drying oven, the carpet is compressed by cooled rolls under a pressure of 5 bar.

B) Filled

The procedure is as described in A), except that 40 to 65% barium sulfate (based on latex solids) are added to the latex mixture foaming, followed by foaming to a weight per liter of 500 g/l. The foam is applied in a layer thickness corresponding to 1200 g solids/m².

EXAMPLE 2

I. Starting latices

A. Soft latex

Polychloroprene latex, unmodified (by sulphur), prepared in the absence of comonomer, solids content 58%, particle diameter $d_{50}$ 190 nm.

B. Hard latex

The same as in Example 1.

II. Production of the latex foam 70 parts hard latex dispersion,
112 parts of soft latex dispersion,
9 parts sodium sulfosuccinamate (30% in water),
12 parts disodium N-octadecyl sufosuccinate (25% in water),
2 parts ®Vulkanox BKF (50%) and
5 parts acrylate thickener (®Acrylron A 300 conc., a product of Protex/France, 12% in water)

are mixed (pH value 11.0; viscosity of the mixture 8,000 mPa.s) and adjusted by stir-foaming using a foam mixer to a foam weight per liter of 450 g/l.

III. Carpet backing

A) Unfilled

Similarly to a gel or nongel carpet foam, the latex foam is applied to the back of the carpet in a quantity of 500 to 600 g solids/m² tufted carpet by means of a doctor roller coater and treated with hot air at 150° C. until it is completely dry.

On leaving the drying oven, the carpet is compressed by cooled rolls under a pressure of 5 bar.

B) Filled

The procedure is as described in A), except that 40 to 65% barium sulfate (based on latex solids) are added to the latex mixture before foaming, followed by foaming to a weight per liter of 500 g/l. The foam is applied in a layer thickness corresponding to 1200 g solids/m².

We claim:

1. A formable sheet-form textile material for lining noise-affected rooms, particularly the passenger compartment of motor vehicles, comprising a visible surface, a foamed polymer latex layer, at least one barrier layer and a noise-insulating foamed backcoating, the visible surface comprising, a needlefelt or a tufted surface needled in a felt backing layer, onto the back of which the layer of foamed latex, the barrier layer and the noise-insulating foamed backcoating are applied.

2. A formable sheet-form textile material as claimed in claim 1 wherein the backing layer is a thin layer of a lightly bonded felt onto which a thicker layer of an unbonded felt is laminated by means of an adhesive.

3. A formable sheet-form textile material as claimed in claim 1 wherein the layers have a permeability to noise which decreases continuously from the backing layer to the backcoating.

4. A formable sheet-form material as claimed in claim 2 wherein the adhesive is formed of a soft thermoplast.

5. A formable sheet-like textile material as claimed in claim 1, wherein the barrier layer is formed by a film or coating of an unfoamed latex.

6. A formable sheet-form textile material as claimed in claim 1, wherein the foamed latex is filled with inorganic filler.

7. A formable sheet-form textile material as claimed in claim 1, wherein the polymer for the foam latex consists of one or more copolymers comprising A. 36 to 90 parts of at least one of the units selected from the group consisting of
 a) an aromatic $C_8$-$C_{14}$ vinyl or vinylidene compound and
 b) methyl methacrylate, up to 30% by weight of the sum (a+b) being replaceable by
 c) acrylonitrile B. 10 to 64 parts by weight of at least one of a conjugated $C_4$-$C_9$ diene or $C_2$-$C_8$ alkyl acrylate, C. 0 to 8 parts by weight of at least one of an $\alpha,\beta$-ethylenically unsaturated $C_3$-$C_5$ mono- or $C_4$-$C_6$ dicarboxylic acid and D. 0 to 10 parts by weight of other copolymerizable compounds, the sum of components A. to D. being 100 parts by weight.

8. A formable sheet-form textile material as claimed in claim 7 wherein the latex base consists of one or more polymers of from 45 to 80 parts by weight styrene and, 20 to 55 parts by weight butadiene or n-butyl acrylate and 0 to 5 parts by weight unsaturated acid C.

9. A formable sheet-form textile material as claimed in claim 1 wherein the latex contains at least two polymers having different glass transition temperatures, wherein a first polymer is a hard latex having a higher glass transition temperature than a second polymer which is a soft latex having film-forming properties.

10. A formable sheet-form textile material as claimed in claim 9 wherein the hard latex polymer contains 92 to 100% by weight polymerized units of component A. and 0 to 8% by weight copolymerized units of component C., based in either case on hard latex polymer.

11. A formable sheet-form textile material as claimed in claim 9 wherein the soft latex polymer contains 20 to 75% by weight copolymerized units of component A., 25 to 80% by weight copolymerized units of component B., 0 to 8% by weight copolymerized units of component C. and 0 to 10% by weight copolymerized units of component D., based in each case on soft latex polymer.

12. A formable sheet-form textile material as claimed in claim 10 wherein the hard latex has a glass transition temperature above 90° C. while the soft latex has a glass transition temperature below 30° C. and the latice are mixed in a ratio of 45/55 to 80/20 and the average particle diameter $d_{50}$ of the latex polymers is between 50 and 300 nm.

* * * * *